(12) United States Patent
Wan et al.

(10) Patent No.: US 7,401,734 B1
(45) Date of Patent: Jul. 22, 2008

(54) REAL WORLD SHOWROOM

(75) Inventors: Dadong Wan, Palatine, IL (US);
Anatole V. Gershman, Chicago, IL (US); Adam B. Brody, Chicago, IL (US)

(73) Assignee: Accenture LLP, Palo Alto, CA (US)

( * ) Notice: Subject to any disclaimer, the term of this patent is extended or adjusted under 35 U.S.C. 154(b) by 741 days.

(21) Appl. No.: 10/792,952

(22) Filed: Mar. 4, 2004

Related U.S. Application Data

(63) Continuation of application No. 09/812,181, filed on Mar. 19, 2001, now Pat. No. 6,766,947.

(51) Int. Cl.
*G06K 15/00* (2006.01)

(52) U.S. Cl. .................................. 235/383; 235/375

(58) Field of Classification Search ............... 235/383, 235/375, 492, 381; 705/16, 26, 27
See application file for complete search history.

(56) References Cited

U.S. PATENT DOCUMENTS

| | | | |
|---|---|---|---|
| 5,796,351 A | | 8/1998 | Yabuki |
| 5,835,861 A | | 11/1998 | Whiteside |
| 5,918,211 A | * | 6/1999 | Sloane .................. 705/16 |
| 6,154,138 A | * | 11/2000 | Nilsson ................... 340/572.8 |
| 6,154,738 A | * | 11/2000 | Call ............................ 707/4 |
| 6,386,448 B1 | * | 5/2002 | Addy ........................ 235/383 |
| 6,661,433 B1 | * | 12/2003 | Lee ........................... 715/764 |
| 6,732,934 B2 | * | 5/2004 | Hamilton et al. ....... 235/472.01 |
| 6,854,656 B2 | * | 2/2005 | Matsumori ............. 235/472.01 |

FOREIGN PATENT DOCUMENTS

| | | |
|---|---|---|
| WO | 0063780 A1 | 10/2000 |
| WO | 0101711 A1 | 1/2001 |
| WO | 0137082 A1 | 5/2001 |

OTHER PUBLICATIONS

Johnson, D., "Converting PC GUIs for NonPC Devices", Circuit Cellar Ink, Vernon, CT, vol. 91, Feb. 1998, pp. 40-42, 44-45, XP000852859.
European Patent Application No: EP 1244043 A3 - Search Report.

* cited by examiner

*Primary Examiner*—Ahshik Kim
(74) *Attorney, Agent, or Firm*—Banner & Witcoff, Ltd.

(57) ABSTRACT

A method of retrieving product information and ordering products is disclosed. A consumer observes a product in its real world usage context and scans an RFID tag embedded in the product. A mobile terminal is used to transmit the RFID tag to a computer connected to a computer network. The computer transmits product specification information to the mobile terminal. The consumer may also be given the option of purchasing the product in real time.

16 Claims, 5 Drawing Sheets

REAL WORLD SHOWROOM

This application is a continuation of common-owned U.S. application Ser. No. 09/812,181 filed on Mar. 19, 2001, naming Dadong Wan, Anatole Gershman, and Adam Brody as inventors, now U.S. Pat. No. 6,766,947, the entire disclosure of which is hereby incorporated by reference.

BACKGROUND OF THE INVENTION

This invention relates generally to the field of consumer purchasing. More particularly, the invention provides methods and systems that allow a user to obtain real time information about products observed while the products are being utilized and to purchase the products.

Consumers often observe products while the products are being utilized. It is not uncommon for a consumer to desire to obtain more information about the product or even to purchase a product while observing the product. Generally, the consumer must try to remember information identifying the product and then conduct research at a later time to obtain more information about the product. For example, the consumer may go to a store or a visit a web site and attempt to locate information about the product. Unfortunately, it may be difficult for a consumer to remember that they observed a product that was of interest to them or to remember enough information to later identify the product.

Therefore, there exists a need in the art for a system that allows consumers to obtain information and purchase products in real time while observing the products as they are being utilized.

SUMMARY OF THE INVENTION

The present invention provides systems and methods that reduce the gap between where consumers use products and where consumers purchase products. The advantages of the present invention are provided by a method of obtaining information about a product. The method includes the steps of observing a product while the product is being utilized and reading a tag embedded in the product to obtain product identifying information. The product identifying information is transmitted to a computer connected to a computer network. Product specification information is then received from the computer.

In one implementation, the tag comprises a radio frequency identification tag and the reading step comprises scanning the tag with a radio frequency receiver.

The method may also include the step of purchasing the product by transmitting order information to the computer.

In another embodiment of the invention, a method of identifying and rewarding consumers who display products to other consumers is provided. The method includes the step of storing, in a database, an RFID code of a tag embedded in a product and the identification of a first consumer who purchased the product. A request for product specification information including the RFID code is received from a second consumer. The database is searched with the RFID code to identify the first consumer and a reward is provided to the first consumer. The reward may include a commission for sales made to the second consumer. Alternatively, the reward includes a discount on future purchases.

In yet another embodiment of the invention, a mobile terminal configured to obtain product specification information is provided. The mobile terminal includes a receiver that detects radiation reflected by a tag embedded in a product and a communication circuit in wireless communication with a computer network. A controller is configured to receive tag information from the receiver and cause the communication circuit to transmit the tag information to a computer connected to the computer network.

BRIEF DESCRIPTION OF THE DRAWINGS

The present invention is illustrated by way of example and not limited in the accompanying figures in which like reference numerals indicate similar elements and in which.

DETAILED DESCRIPTION OF THE PREFERRED EMBODIMENTS

Figure 1:
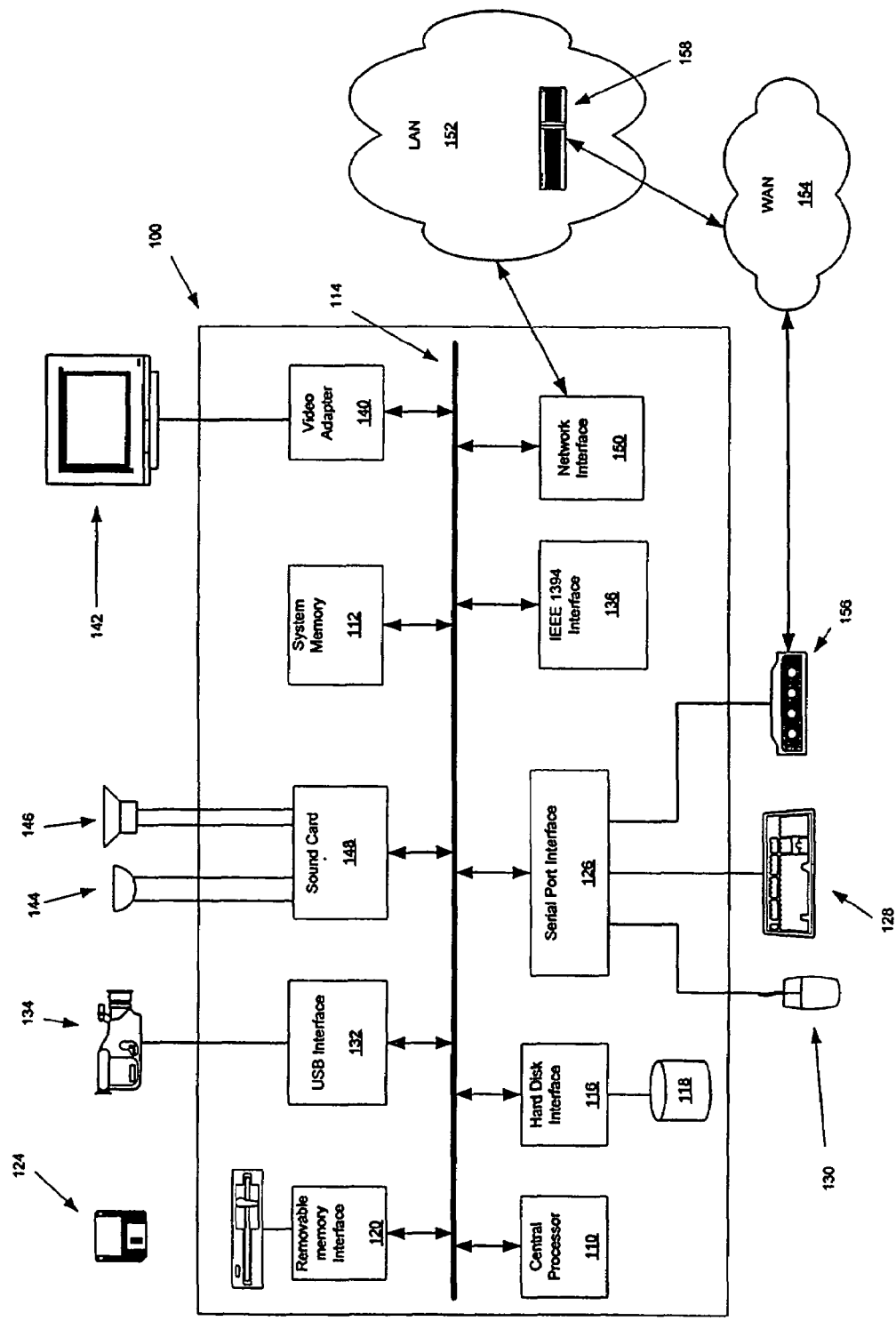
FIG. 1 shows a typical prior art workstation and communication connections.

Elements of the present invention may be implemented with computer systems, such as the system 100 shown in FIG. 1. Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 show a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

Figure 2:
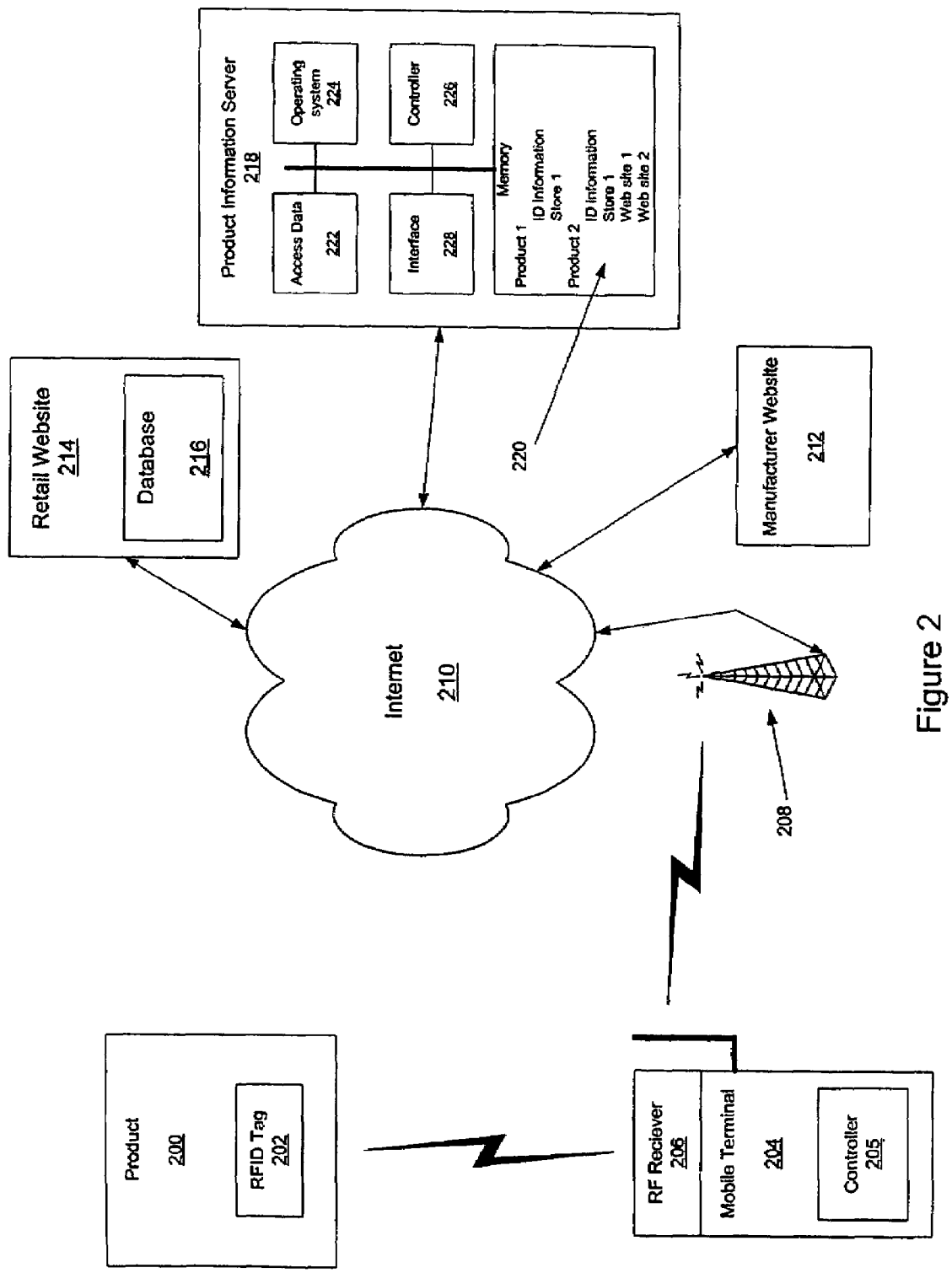
FIG. 2 illustrates a computer network system they can be used to obtain information about products and purchase products, in accordance with an embodiment of the invention.

FIG. 2 illustrates a system for obtaining information about products and purchasing products in accordance with one embodiment of the invention. A product 200 includes an embedded radio frequency identification (RFID) tag 202. The product is preferably observed in its real world usage context and may be one of a variety of different items. Tag 202 is preferably embedded in the product itself as opposed to being attached to a package containing the product so that tag 202 will remain with product 200 throughout the life of product 200. Texas Instruments manufactures suitable RFID tags under the brand name Tag-it. Of course, the present invention may be implemented with other tags and sensors that operate at frequencies other than radio frequencies such as frequencies in the infrared and visible ranges and may incorporate Electronic Product Code (EPC) tags.

A mobile terminal 204 may contain an RF receiver 206 that reads information stored on RFID tag 202 in a wireless manner. A controller 205 controls the overall operation of mobile terminal and may be programmed to implement methods of the present invention. Mobile terminal 204 also communicates with a base station 208 in a wireless manner and may be implemented with a variety of different personal digital assistants, wireless telephones or other wireless devices. In one embodiment of the invention, mobile terminal 204 is implemented with a Palms VII and RF receiver 206 is implemented with a RFID reader module manufactured by Tek Industries attached to the cradle port. In another embodiment, mobile terminal 204 is implemented with a Visor® Prism PDA manufactured Handspring, Inc. and RF receiver 206 is implemented with a Springboard RFID module manufactured by id Systems.

Base station 208 is connected to a computer network, such as the Internet 210, in a conventional manner. One skilled in the art will appreciate that several different websites and servers may be connected to the Internet 210. FIG. 2 shows a manufacturer's website 212 that may contain a variety of different product information. A retail web site 214 may also contain product information, such as the price and availability of a particular product. A database 216 may contain the identification of consumers who have purchased products from retail web site 214 and the identification of RFID tags that are embedded in the purchased products.

A product identification server 218 is also coupled to the Internet 210. Product identification server 218 may be accessed by the user of mobile terminal 204. A memory 220 may store the identification of products, the identification of stores or websites that sell products and additional information that may be useful to the user. The use of information stored in memory 220 will be described in detail below. Access to product identification server 218 may be controlled by information contained in access data module 222. A variety of different methods may be used to control access to product identification server 218. In one embodiment of the invention, the user is required to enter a personal identification number (PIN) before accessing product identification server 218. The overall operation of product identification server 218 may be governed by an operating system program 224 in conjunction with a controller 226. Operating system program 224 and controller 226 may be implemented with conventional programs and electronic components that are well-known to those skilled in the art. Product identification server 218 also includes an interface 228, such as a modem, that allows product identification server 218 to communicate with the Internet 210.

In one embodiment, the present invention is configured to assist a user in managing the user's wardrobe. Product information server 218 may include at least some of the components shown in the wardrobe server disclosed in co-pending U.S. patent application Ser. No. 09/798,232, entitled "Online Wardrobe," the entire disclosure of which is hereby incorporated by reference.

Figure 3:
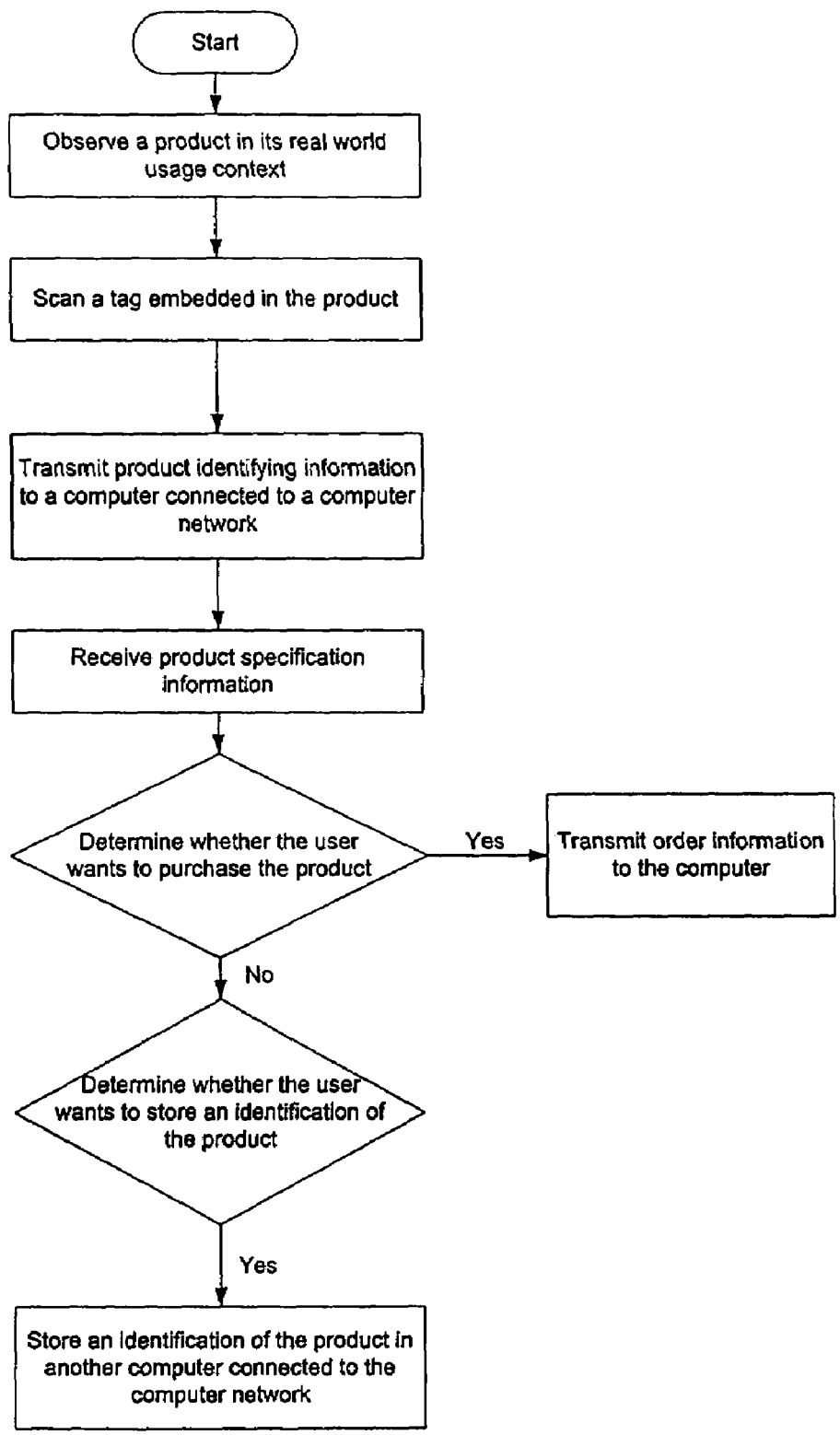
FIG. 3 illustrates a method of obtaining product information in accordance with an embodiment of the invention.

FIG. 3 illustrates a method of obtaining product information and purchasing products in accordance with an embodiment of the invention. First, in step 302, a user observes a product in its real world usage context. Consumers may make better purchasing decisions when observing a product as it is intended to be utilized instead of observing a product in a package in a store. In step 304, the user scans a tag embedded in the product. The user may utilize mobile terminal 204 to scan and RFID tag 202 embedded in the product to obtain product identifying information. Product identifying information may include a product part number, manufacturing date, serial number or any other information they can be used to identify a product. A tag is "embedded" when it is attached to the product in a manner that makes it unlikely that the tag will be removed. The methods used to embed tags may differ for different products. For example, it may be sufficient to embed an RFID tag 202 to a table by taping the tag to the table, where as it may be necessary to actually locate RFID tags within other products.

After receiving the product identifying information, the information is transmitted to a computer connected to a computer network in step 306. Mobile terminal 204 may transmit the product information to the computer network in a wireless manner. The use of a mobile terminal 200 configured to communicate with the computer network in a wireless manner facilitates obtaining product information at the moment that the user observes the product. The user receives product specification information in step 308. Product specification information may be received from a website, such as retail website 214 and may include characteristics of the product, availability of the product, price of the product or any other information that may be of interest to a potential consumer.

Figure 4:
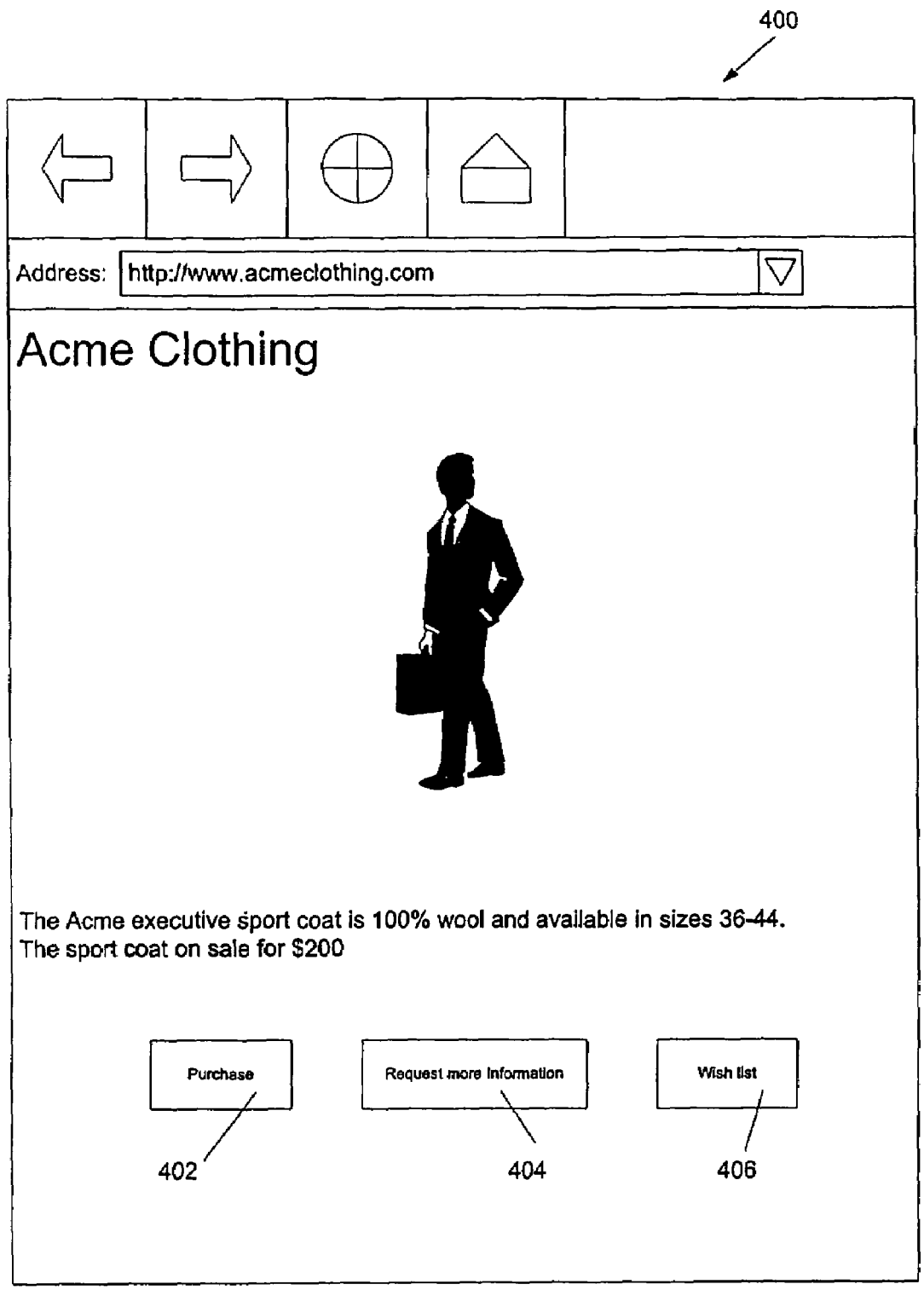
FIG. 4 illustrates a web page that may display product specification information to a user.

FIG. 4 shows a web page 400 that may be displayed on mobile terminal 204 to convey product specification information to a user. One skilled in the art will appreciate that there are a number of different methods to present product specification information to a user. The method selected may be a function of the size of a display screen of mobile terminal 204 or the communication protocol utilized by mobile terminal 204. If the display screen of mobile terminal 204 is relatively small, it may be necessary to transmit text describing the product with simple menu selection items. Web page 400 may be displayed to the user after the user scans an RFID tag embedded in a sport coat. In step 300 it is determined whether the user wants to purchase the product. The user may purchase the product by selecting purchase button 402. If the user desires to purchase the product, order information may be transmitted to the computer connected to the computer network in step 312. Order information may include an identification of the user, a credit card number or any other information that may be used to purchase the product. The user may request additional product specification information by selecting request more information button 404.

If the user does not want to purchase the product, in step 314 it is determined whether the user wants to store an identification of the product. The user may select wish list button 406. An identification of the product may be transmitted to the computer connected to the computer network in step 316. FIG. 2 shows product identification information stored in memory 220. The information stored in memory 220 may be used by the user to purchase products at a later time. The user may access information stored in memory 220 from the mobile terminal or another device (not shown) configured to communicate with product information server 218. In one embodiment of the invention, the information stored in memory 220 may be retrieved by the user via a kiosk installed in a store. One example of a suitable kiosk configuration is disclosed in co-pending U.S. patent application Ser. No. 09/798,232, entitled "Online Wardrobe." In another embodiment of the invention, product identifying information and the identification of stores and websites that sell the product may be stored locally in mobile terminal 204.

Figure 5:
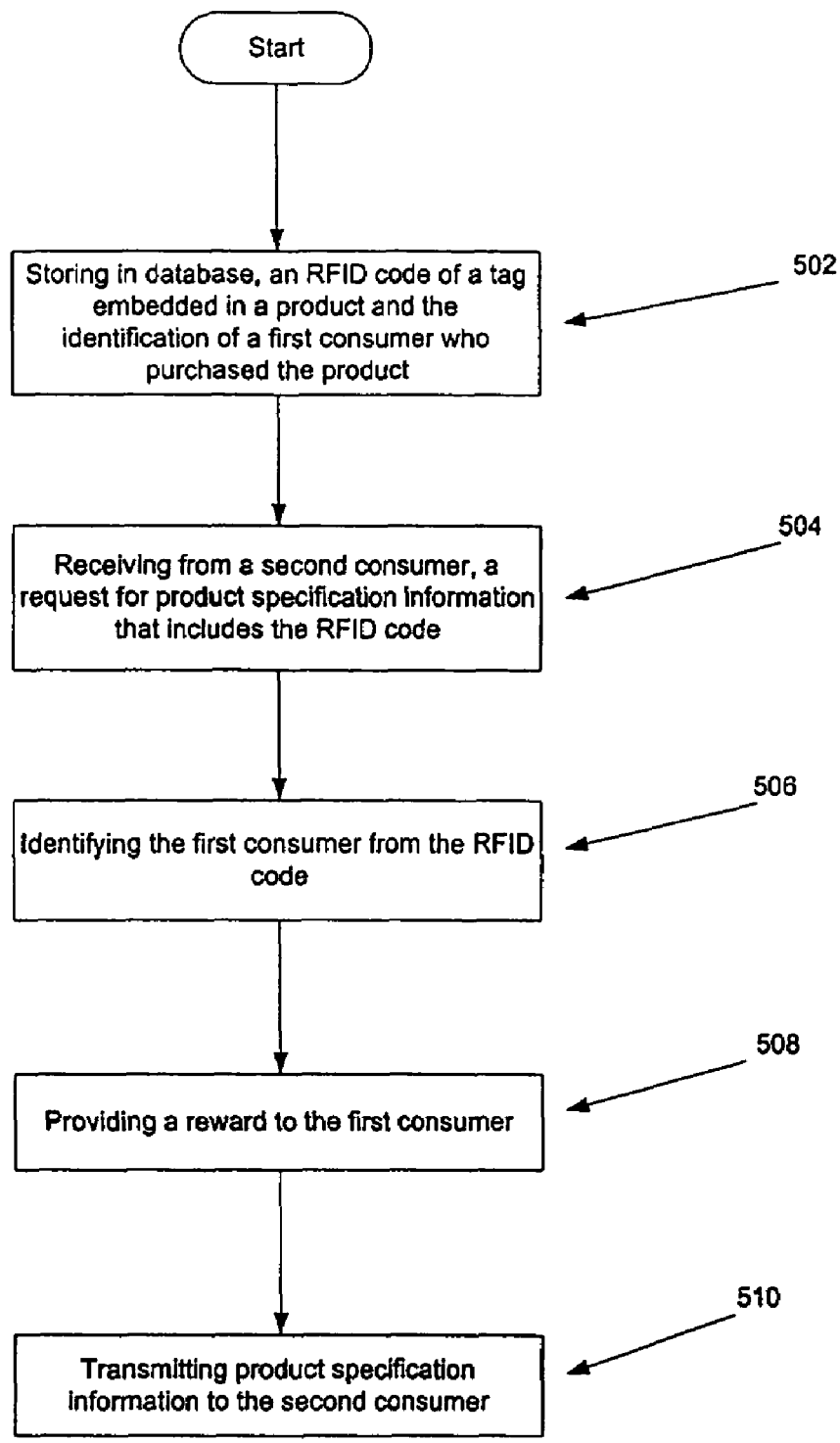
FIG. 5 illustrates a method of rewarding consumers for displaying products to other consumers.

The present invention may also be used by merchants to increase sales. FIG. 5 illustrates a method that may be practiced to reward consumers who display products to other consumers. In step 502, the merchant stores an RFID code of a tag embedded in a product and the identification of a first consumer who purchased the product in a database. Database 216, shown in FIG. 2, may store the identification of consumers who purchase products and corresponding RFID codes. In step 504, the merchant receives a request for product specification information from a second consumer. The request preferably includes the RFID code and may be received in the manner described in detail above.

The identification of the first consumer may be determined from the RFID code in step 506. Next, the merchant may provide a reward to the first consumer in step 508. The reward may include a commission for sales made to the second consumer, a discount on future purchases, or any other reward that provides an incentive for the first consumer to display the product to other consumers. Finally, the product specification information may be transmitted to the second consumer in step 510.

The method shown in FIG. 5 provides an incentive for consumers to contact other consumers and describe the products they have purchased. Consumers are more likely to provide answers to questions and talk positively about products when they know that they will be rewarded when the person they are talking to purchases the product.

While the present invention has been described in connection with the illustrated embodiments, it will be appreciated and understood that modifications may be made without departing from the true spirit and scope of the invention. Furthermore, the disclosed methods made be stored in the form of computer executable instructions on a computer readable medium, such as a computer disk.

The invention claimed is:

1. A method of obtaining information about a product, the method comprising the steps of:
   (a) observing a product while the product is being utilized for an intended purpose of the product;
   (b) reading a tag embedded in the product to obtain product identifying information, wherein the tag is attached to remain with the product throughout a life of the product;
   (c) transmitting the product identifying information to a first computer connected to a computer network; and
   (d) receiving product specification information from the first computer;
   (e) if a customer wants to purchase the product, initiating an order to purchase the product; and
   (f) if the customer does not want to purchase the product, transmitting the product identifying information to an external device.

2. The method of claim 1, wherein the tag comprises a radio frequency identification tag and (b) comprises scanning the tag with a radio frequency receiver.

3. The method of claim 1, wherein (c) comprises transmitting information from a mobile terminal to a computer network in a wireless manner.

4. The method of claim 1, wherein (c) is performed in real time after (b).

5. The method of claim 1, further including the step:
(g) transmitting an identification of the product to a second computer connected to the computer network.

6. The method of claim 1, further comprising:
(g) if the customer does not purchase the product, storing the product identifying information and associating the product identifying information with the customer.

7. The method of claim 6, further comprising:
(h) if the customer subsequently wishes to purchase the product, retrieving the product identifying information.

8. The method of claim 1, wherein (e) includes
transmitting order information through a wireless communication channel, wherein the order information includes transaction information.

9. The method of claim 8, wherein the transaction information is selected from the group consisting of a user identification and a credit card number.

10. The method of claim 1, further comprising:
(g) if the customer requests additional product specification information, sending an associated request with the product identifying information to the first computer;
(h) receiving the additional product specification information, the additional product specification information including a parameter not encompassed by the product specification information; and
(i) presenting the additional product specification information to the customer.

11. The method of claim 1, wherein (f) comprises sending the order to another computer, different from the first computer.

12. A mobile terminal configured to obtain product specification information, the mobile terminal comprising:
a receiver that detects radiation reflected by a tag embedded in a product, wherein the product is being utilized for an intended purpose of the product, and wherein the tag is attached to remain with the product throughout a life of the product;
a communication circuit in wireless communication with a computer network; and
a controller configured to:
receive tag information from the receiver;
cause the communication circuit to transmit the tag information to a computer connected to the computer network;
initiate an order to purchase the product by transmitting order information through the communication circuit to the computer network if a customer wants to buy the product; and
transmit the product identifying information to an external device if the customer does not want to buy the product.

13. The mobile terminal of claim 12, wherein the receiver is a radio frequency receiver.

14. The mobile terminal of claim 12, wherein the controller is further configured to request that the product identifying information be stored at an external storage device.

15. The mobile terminal of claim 14, wherein the controller is further configured to retrieve the product identifying information if the customer wants to subsequently purchase the product.

16. The mobile terminal of claim 12, further comprising:
a display device, wherein the controller is further configured to transmit a request to obtain additional product specification information and to receive the additional product specification information through the communications circuit, and wherein the additional product specification information is presented on the display device.

* * * * *